US008004261B2

(12) United States Patent
Hamaya

(10) Patent No.: US 8,004,261 B2
(45) Date of Patent: Aug. 23, 2011

(54) POWER SUPPLY UNIT AND IMAGE FORMING APPARATUS INCLUDING THE SAME

(75) Inventor: Masahito Hamaya, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 291 days.

(21) Appl. No.: 12/474,554

(22) Filed: May 29, 2009

(65) Prior Publication Data

US 2009/0295352 A1 Dec. 3, 2009

(30) Foreign Application Priority Data

May 30, 2008 (JP) ................................ 2008-143485

(51) Int. Cl.
*G05F 1/575* (2006.01)
*H02M 3/335* (2006.01)

(52) U.S. Cl. ................... 323/283; 363/21.05; 363/21.13

(58) Field of Classification Search ............... 363/21.05, 363/21.13; 323/282, 284, 285, 351
See application file for complete search history.

(56) References Cited

U.S. PATENT DOCUMENTS

| | | | | |
|---|---|---|---|---|
| 4,761,725 | A * | 8/1988 | Henze | 363/46 |
| 5,677,618 | A * | 10/1997 | Fiez et al. | 323/282 |
| 5,969,515 | A * | 10/1999 | Oglesbee | 323/283 |
| 7,148,667 | B2 | 12/2006 | Umemoto et al. | |
| 7,426,123 | B2 * | 9/2008 | Leung et al. | 363/41 |
| 7,541,795 | B1 * | 6/2009 | Smith et al. | 323/285 |
| 7,714,557 | B2 * | 5/2010 | Hasegawa | 323/283 |
| 7,728,749 | B2 * | 6/2010 | Sahu | 341/144 |
| 7,804,256 | B2 * | 9/2010 | Melanson | 315/291 |
| 7,825,642 | B1 * | 11/2010 | Young et al. | 323/224 |
| 2007/0008746 | A1 | 1/2007 | Inukai et al. | |

FOREIGN PATENT DOCUMENTS

| | | |
|---|---|---|
| JP | 63-084207 | 4/1988 |
| JP | 9-218567 | 8/1997 |
| JP | 11-122919 | 4/1999 |
| JP | 2000-232777 | 8/2000 |

(Continued)

OTHER PUBLICATIONS

Japanese Office Action for corresponding application 2008-143485 dated Dec. 22, 2009 (office action cited but did not apply Japanese references).

(Continued)

*Primary Examiner* — Gary L Laxton
(74) *Attorney, Agent, or Firm* — Banner & Witcoff, Ltd.

(57) ABSTRACT

A power supply unit is provided. An output generation circuit generates an output corresponding to an supplied drive signal and supplies the output to a load. A detection circuit receives the output and generates a detection signal in response to the output. A control circuit generates a digital control signal for controlling a value of the output toward a target value in response to the detection signal. A first D/A conversion circuit receives the digital control signal and converts the digital control signal into an analog control signal, the first D/A conversion circuit being capable of setting a reference range for defining a voltage range of the analog control signal. A driving circuit generates the drive signal in response to the analog control signal and supplies the drive signal to the output generation circuit. A range switching circuit switches the reference voltage range of the first D/A conversion circuit between a wide range and a narrow range narrower than the wide range.

9 Claims, 12 Drawing Sheets

FOREIGN PATENT DOCUMENTS

| | | |
|---|---|---|
| JP | 2003-209972 | 7/2003 |
| JP | 2004-088965 | 3/2004 |
| JP | 2004-320892 | 11/2004 |
| JP | 2007-020367 | 1/2007 |

OTHER PUBLICATIONS

Notification of Reason for Refusal in corresponding Japanese Application No. 2008-143485 dated Aug. 5, 2010.

* cited by examiner

POWER SUPPLY UNIT AND IMAGE FORMING APPARATUS INCLUDING THE SAME

CROSS-REFERENCE TO RELATED APPLICATION

This application claims priority from Japanese Patent Application No. 2008-143485, filed on May 30, 2008, the entire subject matter of which is incorporated herein by reference.

TECHNICAL FIELD

Aspects of the present invention relate to a power supply unit and an image forming apparatus including the power supply unit and in particular to the power supply unit and the image forming apparatus capable of enhancing output accuracy with a simple configuration.

BACKGROUND

Patent document 1 discloses a related-art power supply unit. To improve the accuracy of output voltage, this power supply unit is capable of improving the control resolution of the output voltage, for example, by providing a plurality of voltage dividing resistors and switching the voltage dividing resistors in response to the operation mode of a load to which power is supplied.

Patent document 1: Japanese Patent Publication No. 09-218567A

However, when there are a large number of requests for switching the voltage dividing resistors, the related-art power supply unit requires a large number of voltage dividing resistors. In this case, the configuration of the power supply unit becomes complicated and an area for placing circuit components is increased. It results in a cost increase.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

It is an aspect of the present invention to provide a power supply unit capable of enhancing output accuracy with a simple configuration.

The above and other aspects of the present invention are accomplished by providing a power supply unit comprising: an output generation circuit that generates an output corresponding to an supplied drive signal and supplies the output to a load; a detection circuit that receives the output and generates a detection signal in response to the output; a control circuit that generates a digital control signal for controlling a value of the output toward a target value in response to the detection signal; a first D/A conversion circuit that receives the digital control signal and converts the digital control signal into an analog control signal, the first D/A conversion circuit being capable of setting a reference range for defining a voltage range of the analog control signal; a driving circuit that generates the drive signal in response to the analog control signal and supplies the drive signal to the output generation circuit; and a range switching circuit that switches the reference voltage range of the first D/A conversion circuit between a wide range and a narrow range narrower than the wide range.

BRIEF DESCRIPTION OF THE DRAWINGS

The above and other aspects of the present invention will become more apparent and more readily appreciated from the following description of exemplary embodiments of the present invention taken in conjunction with the attached drawings, in which.

DETAILED DESCRIPTION

First Embodiment

A first embodiment of the invention will be discussed with reference to FIGS. 1 to 6.

1. General Configuration of Laser Printer

Figure 1:
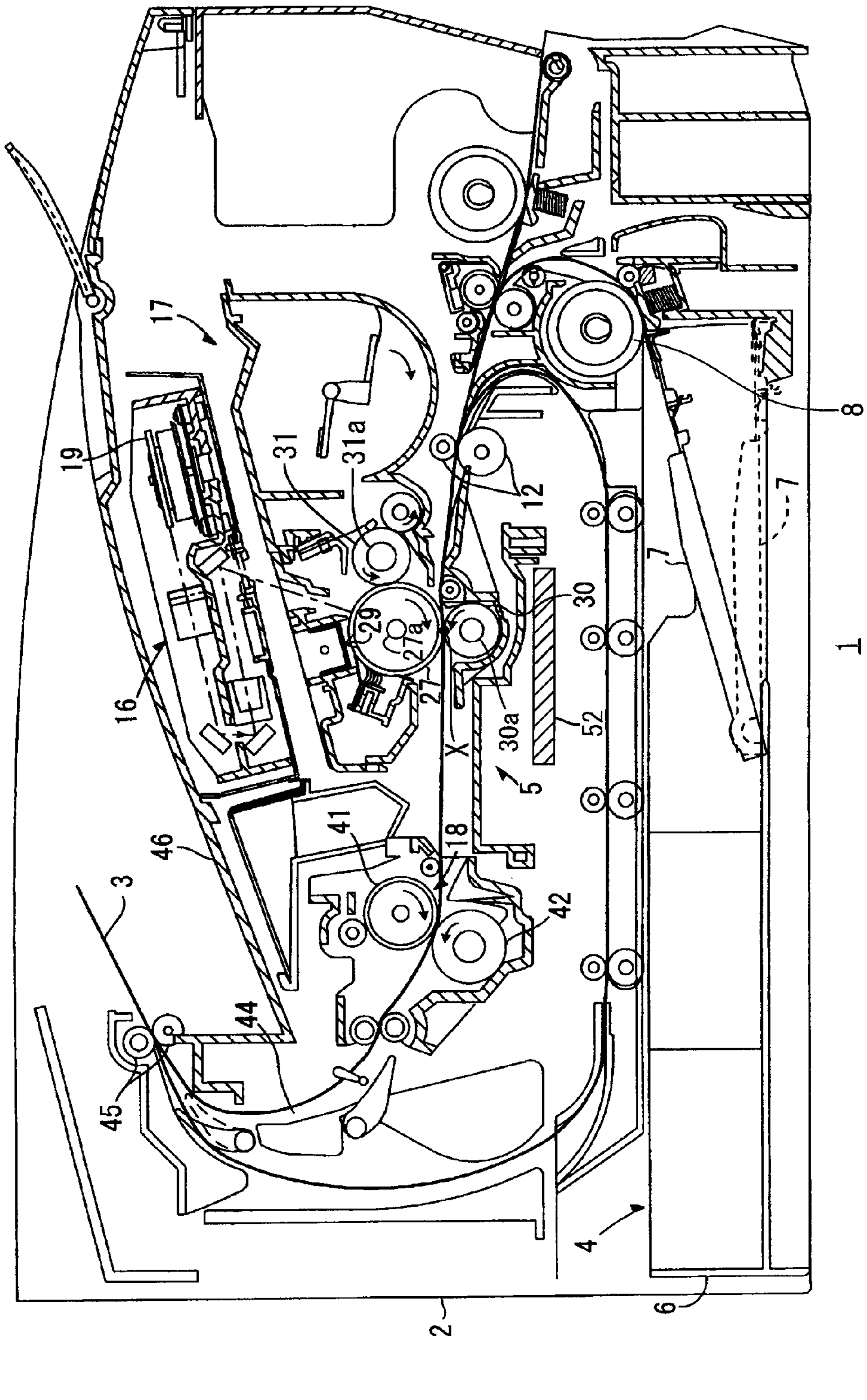
FIG. 1 is a sectional side view illustrating a printer according to a first embodiment of the present invention.

As shown in FIG. 1, the laser printer 1 (printer 1, an example of an image forming apparatus) includes a feeder unit 4 for feeding a sheet 3 (an example of a recording medium), an image forming unit 5 for forming an image on the fed sheet 3, and the like in a main body frame 2. Hereinafter, the right side of FIG. 1 is the front of the printer 1 and the left side of FIG. 1 is the rear (back) of the printer 1.

Here, the image forming apparatus also includes a single-color printer and a color printer of two or more colors. Further, the image forming apparatus may be not only a printer (for example, a laser printer), but also a facsimile machine or a multiple function device including a printer function, a reading function (a scanning function), etc.

(1) Feeder Unit

The feeder unit 4 includes a sheet feeding tray 6, a sheet pressing plate 7, a feed roller 8, and a registration roller 12. The sheet pressing plate 7 can be rotated on the rear end part and the sheet 3 on the top of the sheet pressing plate 7 is pressed against the feed roller 8. The sheet 3 is fed one at a time by rotation of the feed roller 8.

The fed sheet 3 is registered (positioned) by the registration roller 12 and then is sent to a transfer position X. The transfer position X is a position where a toner image on a photoconductive drum 27 is transferred to the sheet 3 and is a contact position between the photoconductive drum 27 and a transfer roller 30.

(2) Image Forming Unit

The image forming unit 5 includes a scanner unit 16, a process cartridge 17, and a fixing unit 18, for example.

The scanner unit 16 includes a laser light emitting unit (not shown), a polygon mirror 19, etc. Laser light emitted from the laser light emitting unit (alternate long and short dash line in FIG. 1) is applied onto the surface of the photoconductive drum 27 while it is deflected by the polygon mirror 19.

The process cartridge 17 includes a developing roller 31, the photoconductive drum 27, a scorotron-type charger 29, and the transfer roller 30. A drum shaft 27*a* of the photoconductive drum 27 is grounded (see FIG. 2).

The charger 29 uniformly charges the surface of the photoconductive drum 27 to a positive polarity. Then, the surface of the photoconductive drum 27 is exposed to the laser light from the scanner unit 16 and an electrostatic latent image is formed. Next, toner supported on the surface of the developing roller 31 is supplied to the electrostatic latent image formed on the photoconductive drum 27 for development.

The developing roller 31 has a metal roller shaft 31*a* covered with a roller made of a conductive rubber material. At the developing time, a predetermined developing bias voltage Vg is applied to the developing roller 31. The transfer roller 30 includes a metal roller shaft 30*a* to which a voltage applying unit (an example of a power supply unit) 60 (see FIG. 2) installed on a circuit board 52 is connected. At the transfer operation time, a transfer bias voltage Vt of an output voltage (an example of an output) Vo is applied from the voltage applying unit 60.

The fixing unit 18 thermally fixes the toner on the sheet 3 while the sheet 3 passes through the nip between a heating roller 41 and a pressing roller 42. The sheet 3 with the toner thermally fixed thereon passes through a sheet discharging path 44 and discharged to a sheet discharging tray 46 through a pair of sheet discharging rollers 45.

2. Configuration of Voltage Applying Unit

The voltage applying unit 60 generates a plurality of high voltages and supplies the generated high voltages to the image forming unit 5. The voltage applying unit 60 shown in FIG. 2 generates the above-mentioned transfer bias voltage (negative high voltage) Vt applied to the transfer roller 30 as a load. Here, the voltage applying unit 60 performs constant current control of a transfer current It (output current Io) flowing by applying the generated transfer bias voltage Vt to the load. The voltage applying unit 60 is not limited to this configuration and can also be applied to generation of a developing bias voltage (positive high voltage) applied to the developing roller 31 as a load.

The voltage applying unit 60 contains a current detection circuit (an example of a detection circuit) 61, a CPU (an example of a control circuit) 62, a first D/A converter for range switching (an example of a range switching circuit and a second D/A conversion circuit) 63, and a second D/A converter for control signal conversion (an example of a first D/A conversion circuit) 64. The voltage applying unit 60 also contains a transformer driving circuit (an example of a driving circuit) 65, a boosting circuit (an example of an output generation circuit) 66, and a voltage detection circuit (an example of a detection circuit) 67. The voltage applying unit 60 further contains memory 72 storing various programs executed by the CPU 62 and the like.

The current detection circuit 61 contains a detection resistor 61*a* having a low resistance value and detects a voltage generated in the detection resistor 61*a*. The current detection circuit 61 generates a current detection signal Si responsive to the detected voltage and supplies the current detection signal Si through an A/D port 62*c* to the CPU 62. The CPU 62 detects the above-mentioned transfer current (an example of a load current) It which is an output current Io based on the current detection signal Si.

The voltage detection circuit 67 contains detection resistors 67*a* and 67*b* each having a high resistance value and detects a voltage at the connection point of the detection resistors 67*a* and 67*b*. The voltage detection circuit 67 generates a voltage detection signal Sv responsive to the detected voltage and supplies the voltage detection signal Sv through an A/D port 62*d* to the CPU 62. The CPU 62 detects the above-mentioned transfer bias voltage Vt which is an output voltage Vo based on the voltage detection signal Sv.

The CPU 62 also generates a digital control signal (digital control voltage) Vd for controlling the output voltage Vo or the output current (an example of an output) Io toward a target value in response to the voltage detection signal Sv or the current detection signal Si, and supplies the digital control signal Vd through a port 62*b* to the second D/A converter 64. The CPU 62 also generates a switch control signal Sc to generate a switch signal Vr in response to the voltage detection signal Sv or the current detection signal Si, and supplies the switch control signal Sc through a port 62*a* to the first D/A converter 63. In the first embodiment, the CPU 62 generates the digital control signal Vd in response to the current detection signal Si so as to set the output current Io to the target value.

The first D/A converter 63 generates the above-mentioned switch signal Vr for switching the reference voltage range of the second D/A converter 64 in response to the switch control signal Sc and supplies the switch signal Vr to at least either of a first reference terminal (REF+) and a second reference terminal (REF−) of the second D/A converter 64.

That is, the first D/A converter 63 switches the reference voltage range of the second D/A converter 64 in response to the voltage detection signal Sv or the current detection signal Si, namely, the value of the output voltage Vo or the output current Io. In the first embodiment, the first D/A converter 63 switches the reference voltage range of the second D/A converter 64 in response to the current detection signal Si, namely, the value of the output current Io.

Figure 2:
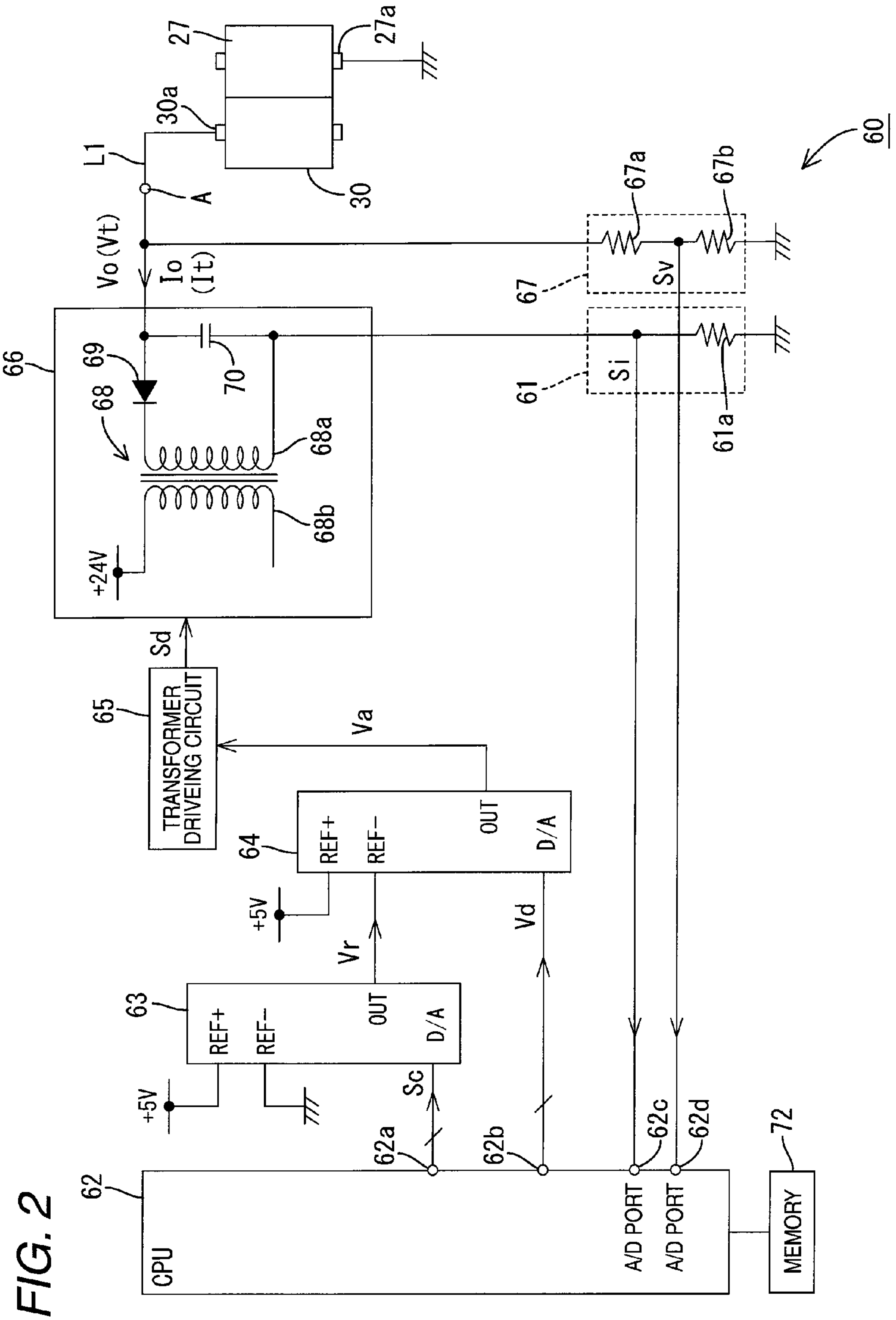
FIG. 2 is a block diagram illustrating a configuration of a voltage applying unit according to the first embodiment of the present invention.

As shown in FIG. 2, a first reference terminal (REF+) of the first D/A converter 63 is connected to a +5-V power supply and a second reference terminal (REF−) of the first D/A converter 63 is connected to ground. That is, the reference voltage range of the first D/A converter 63 is, for example, 0 V to +5 V and the switch signal Vr in the range of 0 V to +5 V responsive to the switch control signal Sc is output from an output terminal OUT of the first D/A converter 63.

The second D/A converter 64 converts the digital control signal Vd into an analog control signal (analog control voltage) Va of an analog voltage. In the second D/A converter 64, the voltage range of the analog control signal Va can be determined and the reference voltage range corresponding to the voltage range of the analog control signal Va can be set. The voltage range of the analog control signal Va thus corresponds to the reference voltage range and therefore in the description to follow, it is assumed that "the voltage range of the analog control signal Va" and "the reference voltage range" are the same.

The second D/A converter 64 has the above-mentioned first reference terminal (REF+) for setting the upper limit value of the reference voltage range (the voltage range of the analog control signal Va) and the above-mentioned second reference terminal (REF−) for setting the lower limit value of the reference voltage range.

As shown in FIG. 2, the first reference terminal (REF+) of the second D/A converter 64 is connected to a +5-V power supply and the second reference terminal (REF−) of the second D/A converter 64 is connected to the output terminal OUT of the first D/A converter 63. That is, the upper limit value of the reference voltage range of the second D/A converter 64 is +5 V and the lower limit value of the reference voltage range of the second D/A converter 64 changes, for example, in the range of 0 V to +5 V in response to the switch signal Vr. Thus, the voltage range of the analog control signal Va output by the second D/A converter 64 is switched by the switch signal Vr. From an output terminal OUT of the second D/A converter 64, the analog control signal Va responsive to the digital control signal Vd is output in the voltage range switched by the switch signal Vr.

In the embodiment, the first D/A converter 63 and the second D/A converter 64 are each a 10-bit D/A converter, for example. The switch control signal Sc and the digital control signal Vd are each a 10-bit digital signal and are supplied to input terminals of the D/A converters 63 and 64. The decimal value indicated by the digital control signal Vd is an arbitrary value between 0 and 1023.

The transformer driving circuit 65 receives the analog control signal Va, generates a drive signal Sd responsive to the analog control signal Va, and supplies the drive signal Sd to the boosting circuit 66. The boosting circuit 66 includes a transformer 68, a diode 69, a smoothing capacitor 70, etc., for example.

The transformer 68 contains a secondary winding 68*a* and a primary winding 68*b* and one end of the secondary winding 68*a* is connected through the diode 69 and a connection line L1 to the roller shaft 30*a* of the transfer roller 30. An anode of the diode 69 is connected to ground through the smoothing capacitor 70 and the voltage detection circuit 67. On the other hand, an opposite end of the secondary winding 68*a* is connected to ground through the current detection circuit 61. The smoothing capacitor 70 is connected in parallel with the secondary winding 68*a*.

According to the configuration, the voltage of the primary winding 68*b* is boosted and rectified in the boosting circuit 66 and is applied to the roller shaft 30*a* of the transfer roller 30 as the above-mentioned transfer bias voltage (here, for example, negative high voltage) Vt. At this time, the transfer current It flowing into the transfer roller 30 (the value of the current flowing in the arrow direction in FIG. 2 is positive) is detected through the current detection circuit 61.

At the transfer operation time when the sheet 3 arrives at the transfer position X and a toner image on the photoconductive drum 27 is transferred to the sheet, the CPU 62 gives the digital control signal Vd to the second D/A converter 64. Accordingly, the transfer bias voltage Vt is applied from the boosting circuit 66 to the roller shaft 30*a* of the transfer roller 30. In addition, the CPU 62 executes constant current control of supplying to the second D/A converter 64 the digital control signal Vd appropriately changed based on the current detection signal Si (feedback signal) responsive to the transfer current It so that the transfer current It falls within the proximity of a predetermined target current, for example.

3. Configuration for Measuring Load Resistance

Next, the configuration for calculating load resistance R of a power supply passage for supplying power to the transfer roller 30 (passage from an output end A through the transfer roller 30 and the photoconductive drum 27 to ground; corresponding to "load" in the invention) will be discussed.

As shown in FIG. 2, at the transfer operation time of the voltage applying unit 60, the current detection signal Si from the current detection circuit 61 is supplied to the A/D port 62*c* of the CPU 62, and the voltage detection signal Sv from the voltage detection circuit 67 is supplied to the A/D port 62*d* of the CPU 62. The CPU 62 inputs the detection signals Si and Sv and calculates the load resistance R from the following Expression 1 concerning the current value of the transfer current It and the voltage value of the output voltage Vo:

$$Vo=1/[\{1/(\text{resistance of resistor }67a+\text{resistance of resistor }67b)\}+(1/\text{load resistance }R)]\times It \qquad \text{(Expression 1)}$$

Here, Vo, the resistances of the resistors 67*a* and 67*b*, and It are known and thus the load resistance R can be calculated from expression 1. The load resistance R contains the resistance of the transfer roller 30, the photoconductive drum 27, etc.

4. Constant Current Control of Output Current

Next, the constant current control of the output current Io of the transfer current It performed by the voltage applying unit 60 of the invention described above will be discussed with reference to FIGS. 3 to 6.

Figure 3:
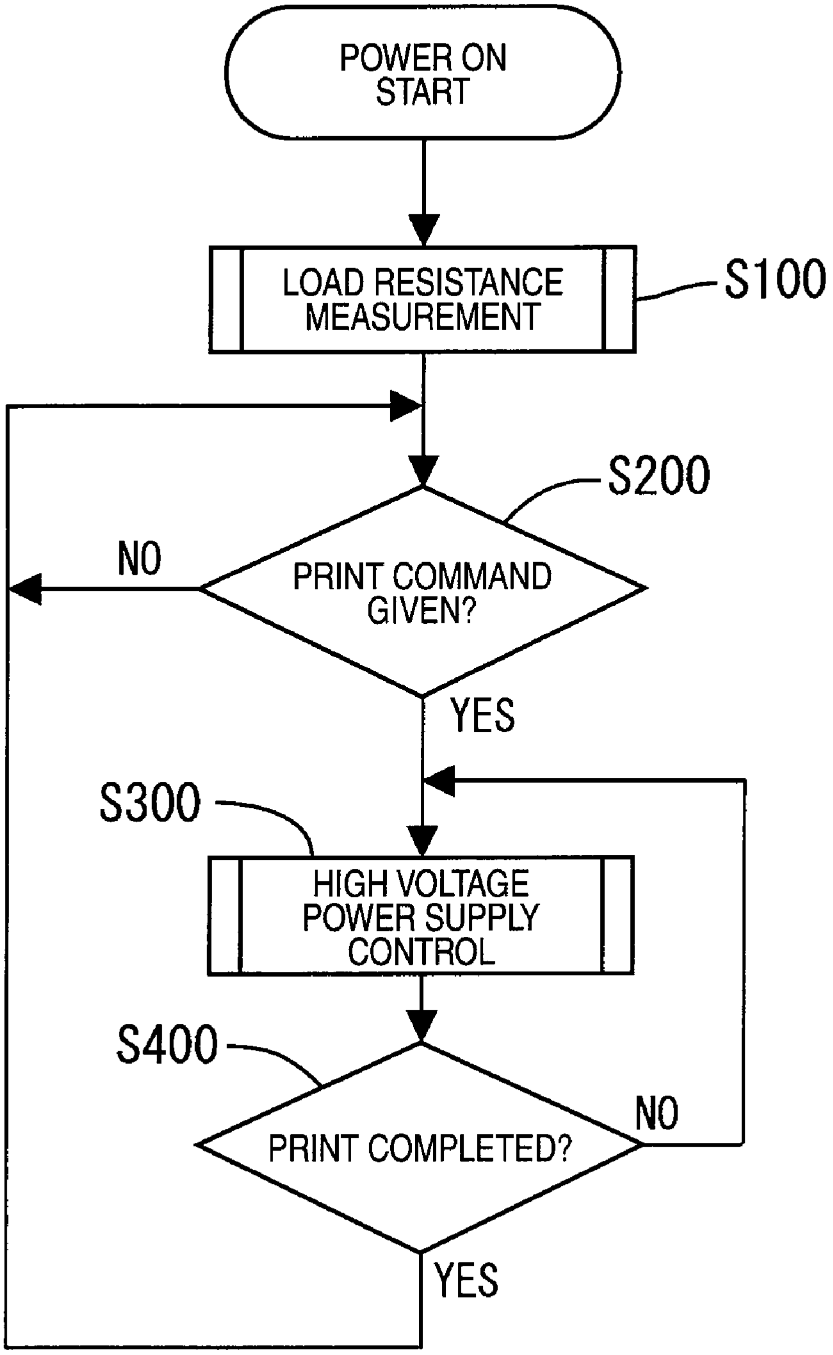
FIG. 3 is a flowchart schematically illustrating output voltage control processing of the voltage applying unit.

As shown in FIG. 3, the constant current control is started by the CPU 62 as power of the printer 1 is turned on. The CPU 62 first executes the "load resistance measurement" routine at step S100 in FIG. 3.

Figure 4:
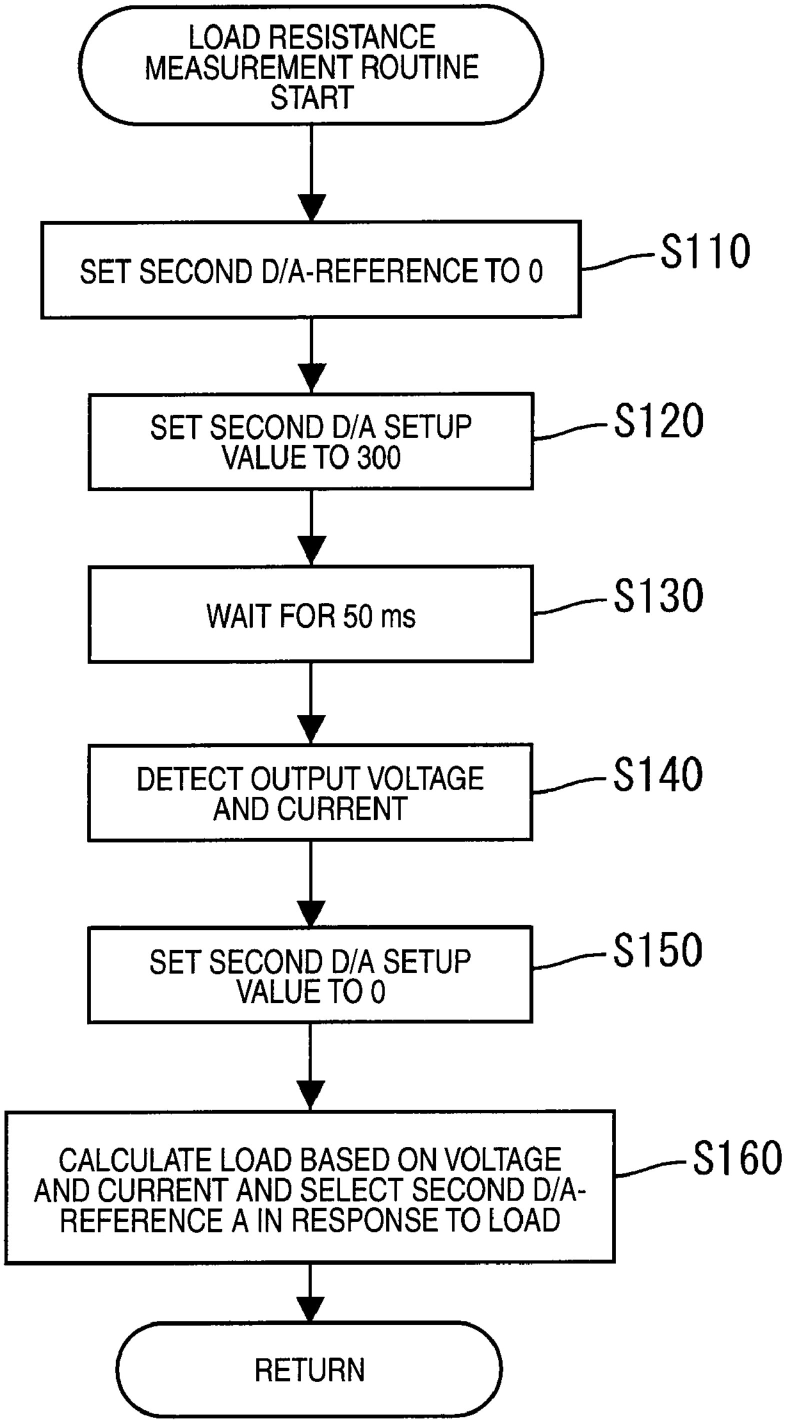
FIG. 4 is a flowchart illustrating processing of load resistance measurement in FIG. 3.

As shown in FIG. 4, at step S110, the CPU 62 sets the value of "second D/A− (minus) reference" which is the value of the switch signal Vr to the second reference terminal (REF−) of the second D/A converter 64 to "0." That is, the CPU 62 generates the switch control signal Sc of a setup signal of the first D/A converter 63 so that the value of the switch signal Vr of the first D/A converter 63 becomes 0 V, and supplies the switch control signal Sc to the first D/A converter 63.

Next, at step S120 in FIG. 4, the CPU 62 sets, for example, "300" as "second D/A setup value (value of digital control signal Vd)" and at step S130, waits until the output current Io becomes stable for a predetermined time, for example, 50 ms. At step S140, the CPU 62 detects the output voltage Vo and the output current Io in response to the current detection signal Si and the voltage detection signal Sv.

Next, at step S150, the CPU 62 sets "0" as "second D/A setup value" and causes the boosting circuit 66 to stop generating the output voltage Vo. At step S160, the CPU 62 calculates the load resistance R based on the detected output voltage Vo, the transfer current It, and expression 1. The CPU 62 selects value "A" of "second D/A minus reference" in response to the calculated load resistance R.

More particularly, the CPU 62 selects the value of the switch control signal Sc so that the value of the switch signal Vr of the first D/A converter 63 becomes "A" V. Then, the CPU 62 exits the "load resistance measurement" routine and returns to the main routine (step S200) in FIG. 3. The CPU 62 selects the value of "A" responsive to the load resistance R based on table data indicating the correspondence between the load resistance R and the value of "A," for example. The table data is stored in the memory 72, for example.

Figure 6:
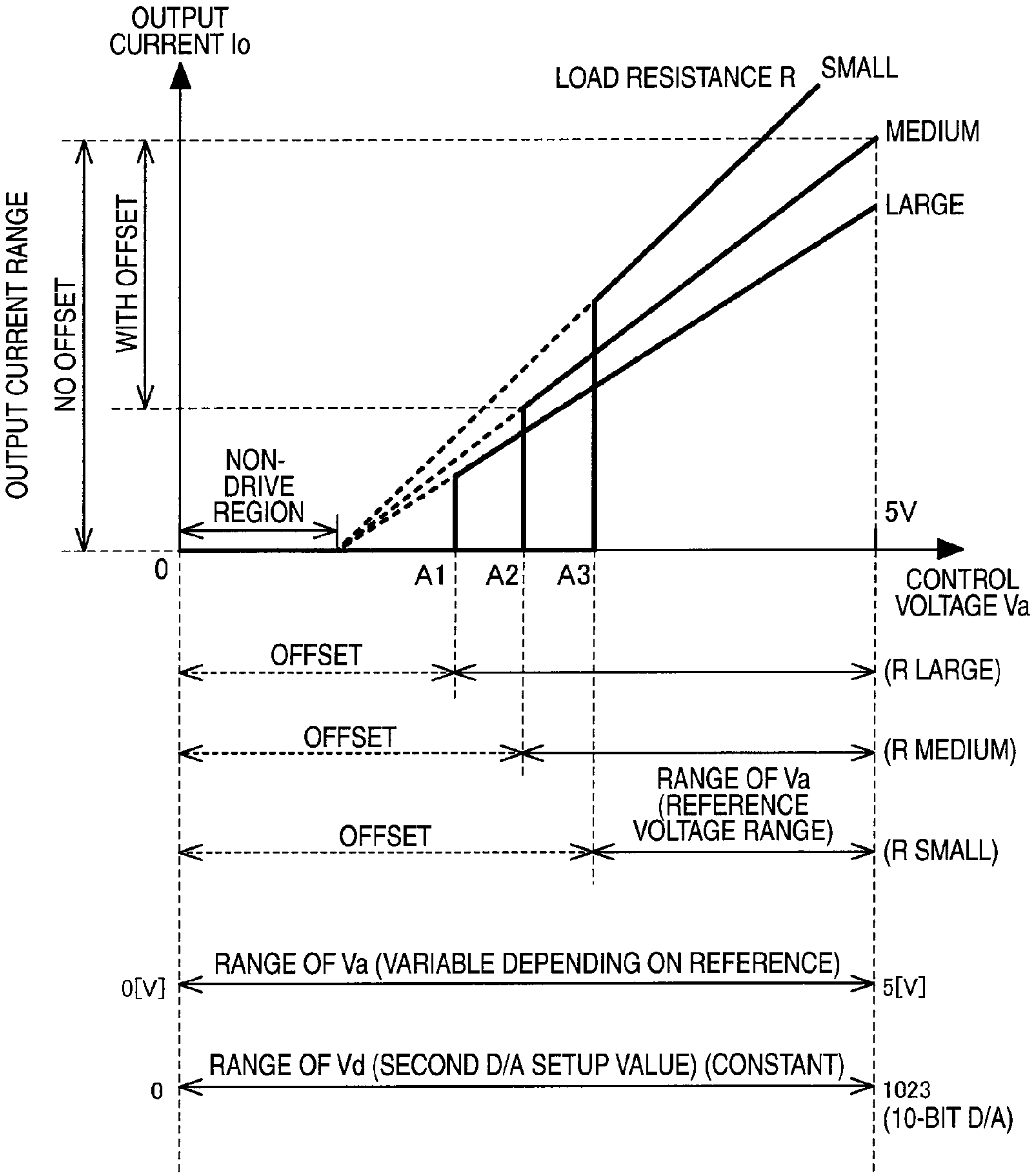
FIG. 6 is a graph schematically illustrating the output characteristic of the voltage applying unit.

A change mode of the reference voltage range in the first embodiment and the reason why the value "A" of "second D/A minus reference" is selected in response to the load resistance R will be discussed below with reference to the graph indicating the output characteristic of the voltage applying unit 60 in FIG. 6: In the grapy of FIG. 6, the solid dashed line indicates the case where the reference voltage range is not changed. The grapy of FIG. 6 is schematically shown for making the description easy.

As shown in FIG. 6, if the output voltage Vo is high, usually a non-drive region is provided for safety in about 10% to 20% of the control voltage (analog control voltage) Va. Thus, to enhance the control accuracy of the output current Io, preferably at least the non-drive region is excluded from the control range of the control voltage Va. Then, in the first embodiment, the reference voltage range is changed using the second reference terminal (REF−) of the second D/A converter 64. As the reference voltage range is changed, an offset is provided in the output dynamic range of the second D/A converter 64 (the voltage range of the analog control signal Va). According to the offset, at least the non-drive region is excluded from the voltage range of the analog control signal Va (here, 0 V to 5 V). The offset is thus provided in the range of the control signal Va, whereby the voltage range of the analog control signal Va, namely, the control range of the output current Io is narrowed as the control range of the digital control signal Vd (here, 0 to 1023) is constant. Thus, the control resolution of the output current Io is enhanced and the control accuracy of the output current Io is also enhanced.

As shown in FIG. 6, the output characteristic of the voltage applying unit 60 changes in response to the value of the load resistance R. For example, to perform constant current control of the boosting circuit 66 to a predetermined target output current, as the load resistance R becomes smaller, the inclination of the output characteristic line becomes larger, as shown in FIG. 6. Thus, the voltage range of the analog control signal Va appropriate for providing the target output current also varies depending on the load resistance R.

Then, in the embodiment, to set the offset in response to the load resistance R in the voltage range of the analog control signal Va, the value "A" of "second D/A minus reference" is selected in response to the load resistance R. As the load resistance R becomes smaller, the value of "A" is selected as it becomes larger like A1 to A2 to A3, for example, as shown in FIG. 6. The value "A" of "second D/A minus reference" is thus selected, whereby the voltage range of the analog control signal Va required for controlling the output current Io toward the target output current can be preferably set in response to the load resistance R.

Again referring to FIG. 3, at step S200, the CPU 62 determines whether or not the user gives a print command after turning on power of the printer 1. If the user does not give a print command, the CPU 62 repeats step S200. On the other hand, if the user gives a print command, the CPU 62 goes to step S300 and executes the "high voltage power supply control" routine.

Figure 5:
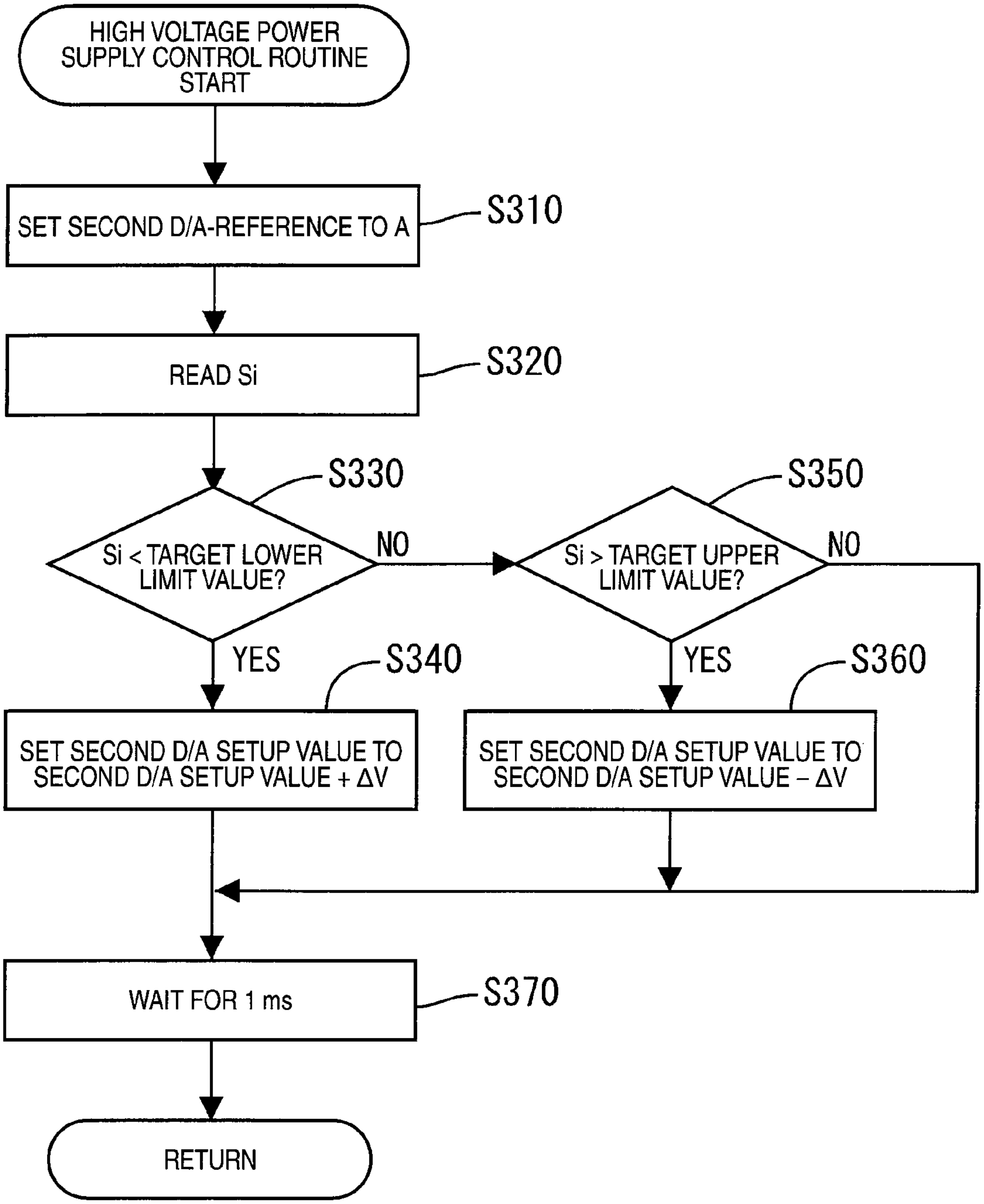
FIG. 5 is a flowchart illustrating processing of high voltage power supply control in FIG. 3.

As shown in FIG. 5, at step S310, the CPU 62 sets the value "A" selected at step S160 in FIG. 4 as the value of "second D/A minus reference." Specifically, the CPU 62 generates the switch control signal Sc so that the value of the switch signal Vr of the first D/A converter 63 becomes "A" V and supplies the switch control signal Sc to the first D/A converter 63.

Next, at step S320, the CPU 62 reads the current detection signal Si from the current detection circuit 61, the detection signal of the output current Io at the time. In the description to follow, the value of the current detection signal Si (voltage value) is also denoted by the symbol "Si."

At step S330, the CPU 62 determines whether or not the current detection signal Si is smaller than a predetermined target lower limit value, namely, whether or not the output current Io is smaller than the target lower limit value. To obtain the output current Io in the target range, the CPU 62 controls the digital control signal Vd so that the current detection value Si (feedback value) becomes a value in the target range.

If the CPU 62 determines at step S330 that the current detection value Si is smaller than the target lower limit value, to increase the analog control voltage value Va and bring the output current Io close to the target value, at step S340, the CPU 62 sets "second D/A setup value" to "second D/A setup value+ΔV" and increments the "second D/A setup value" by a predetermined amount ΔV. At step S370, the CPU 62 waits for a predetermined time (for example, 1 ms) and then returns to the main routine (step S400) in FIG. 3.

On the other hand, if the CPU 62 determines at step S330 that the current detection value Si is equal to or greater than the target lower limit value, at step S350, the CPU 62 determines whether or not the current detection value Si is larger than the target upper limit value.

If the CPU 62 determines at step S350 that the current detection value Si is larger than the target upper limit value, to decrease the analog control voltage value Va and bring the output current lo close to the target value, at step S360, the CPU 62 sets "second D/A setup value" to "second D/A setup value−ΔV" and decrements the "second D/A setup value" by a predetermined amount ΔV. At step S370, the CPU 62 waits for a predetermined time (for example, 1 ms) and then returns to the main routine (step S400) in FIG. 3. The target lower limit value and the target upper limit value of the output current Io are determined previously by experiment, etc., as the allowable values of the target value. That is, the constant current control by feedback of the current detection value Si is performed so that the output current Io exists between the target lower limit value and the target upper limit value.

On the other hand, if the CPU 62 does not determine at step S350 that the current detection value Si is larger than the target upper limit value, the CPU 62 does not change the "second D/A setup value," because it is determined that the output current Io is equal to or greater than the target lower limit value and is equal to or less than the target upper limit value and is within the predetermined target output range. At step S370, the CPU waits for a predetermined time (for example, 1 ms) and then returns to the main routine (step S400) in FIG. 3.

Thus, in the "high voltage power supply control" routine in the first embodiment, the value "A" selected in response to the load resistance R is set as the value of "second D/A minus reference," whereby the offset in the voltage range of the analog control signal Va is set in response to the load resistance R. Thus, the output current Io is controlled in the voltage range of the analog control signal Va responsive to the load resistance R. At the time, the control resolution of the output current Io is enhanced and the control accuracy of the output current Io is also enhanced.

Again referring to FIG. 3, at step S400, the CPU 62 determines whether or not the print is complete. If the print is complete, the CPU 62 returns to step S200 and waits for a new print command. On the other hand, if the CPU determines at step S400 in FIG. 3 that the print is not complete, the CPU 62 returns to step S300 and repeats execution of the "high voltage power supply control" routine until the CPU 62 determines that the print is complete. Whether or not the print is complete is determined based on detecting by a sheet discharge sensor (not shown) that the last sheet 3 of the print has been discharged to sheet discharging tray 46, for example.

5. Advantages of First Embodiment

In the first embodiment, the voltage range of the analog control signal Va is appropriately changed simply by changing the reference voltage range of the second D/A converter 64 without using any complicated circuit configuration and the control accuracy of the output current Io (transfer current It) can be enhanced.

Further, the load resistance R is calculated and the reference voltage range of the second D/A converter 64 is switched in response to the load resistance R. Thus, the voltage range of the analog control signal Va corresponding to the load is set and the output current Io can be controlled with high accuracy toward the target current in the setup voltage range of the analog control signal Va.

Second Embodiment

Next, a second embodiment of the invention will be discussed with reference to FIGS. 7 to 10. Here, FIG. 10 shows a graph in predetermined load resistance R.

The first and second embodiments differ only in the configuration involved in control of output current Io (transfer current It) of voltage applying unit 60. Thus, only the difference in the configuration involved in control of the output current Io will be discussed below. Therefore, in FIGS. 7 to 10, components identical with those of the first embodiment are denoted by the same reference numerals and steps identical with those of the first embodiment are denoted by the same step numbers and will not be discussed again.

Figure 7:
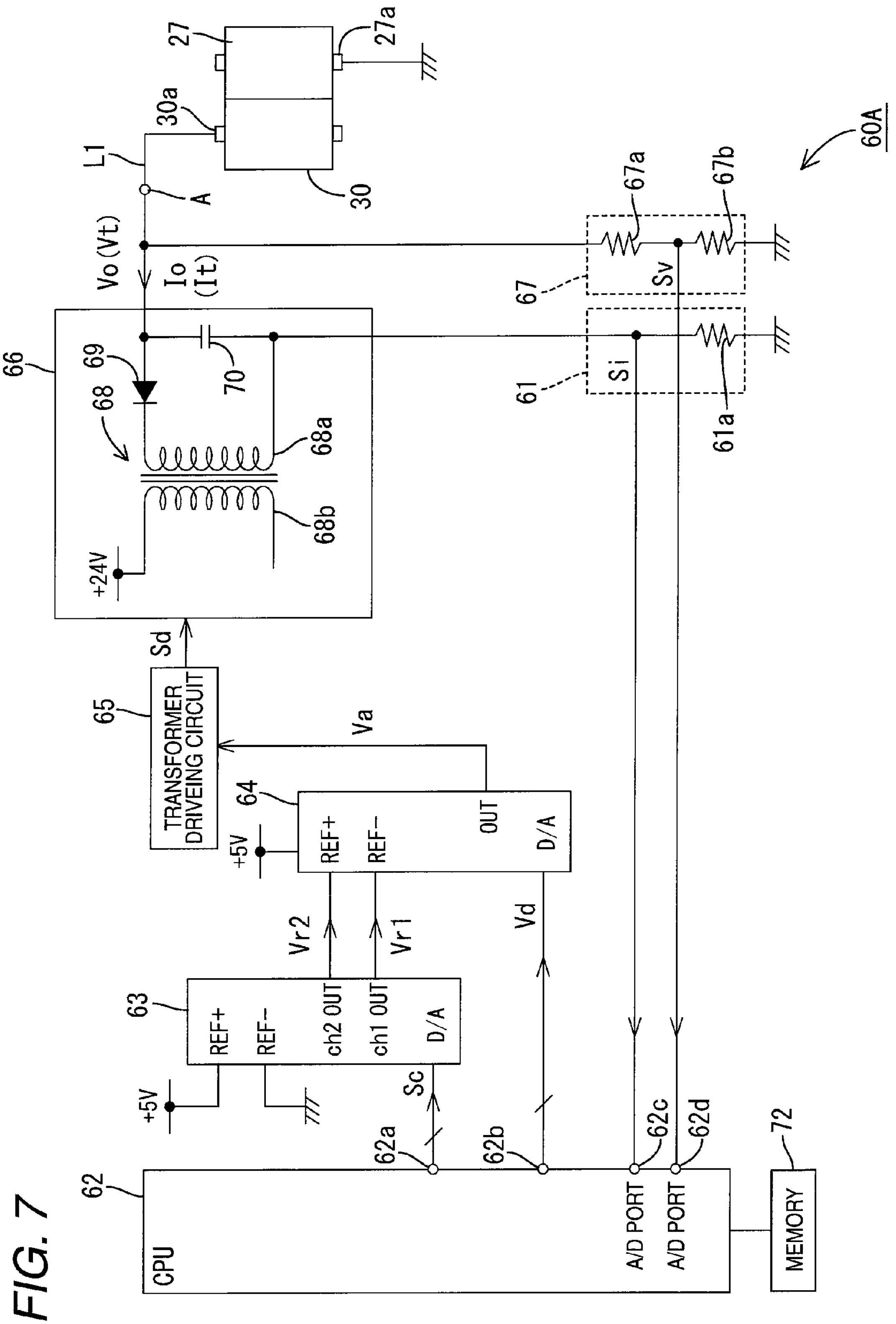
FIG. 7 is a block diagram illustrating a configuration of a voltage applying unit according to a second embodiment of the present invention.

The voltage applying unit 60A of the second embodiment and the voltage applying unit 60 of the first embodiment differ in that a D/A converter of multiple channels is used as a first D/A converter 63 of the voltage applying unit 60A and the upper and lower limit values of the reference voltage range of a second D/A converter 64 are switched by the first D/A converter 63, as shown in FIG. 7.

That is, in the second embodiment, both reference terminals (REF+ and REF−) of the second D/A converter 64 are connected to the first D/A converter 63. The first D/A converter 63 supplies a first switch signal Vr1 from a first channel output terminal (ch1 OUT) to the first reference terminal (REF−) of the second D/A converter 64 and supplies a second switch signal Vr2 from a second channel output terminal (ch2 OUT) to the second reference terminal (REF+) of the second D/A converter 64.

Next, only the difference of control of the output current Io by the voltage applying unit 60A in the second embodiment from control of the output current Io in the first embodiment will be discussed with reference to FIGS. 8 to 10. The first and second embodiments are identical in general flow of the control processing of the output current Io shown in FIG. 3.

Figure 8:
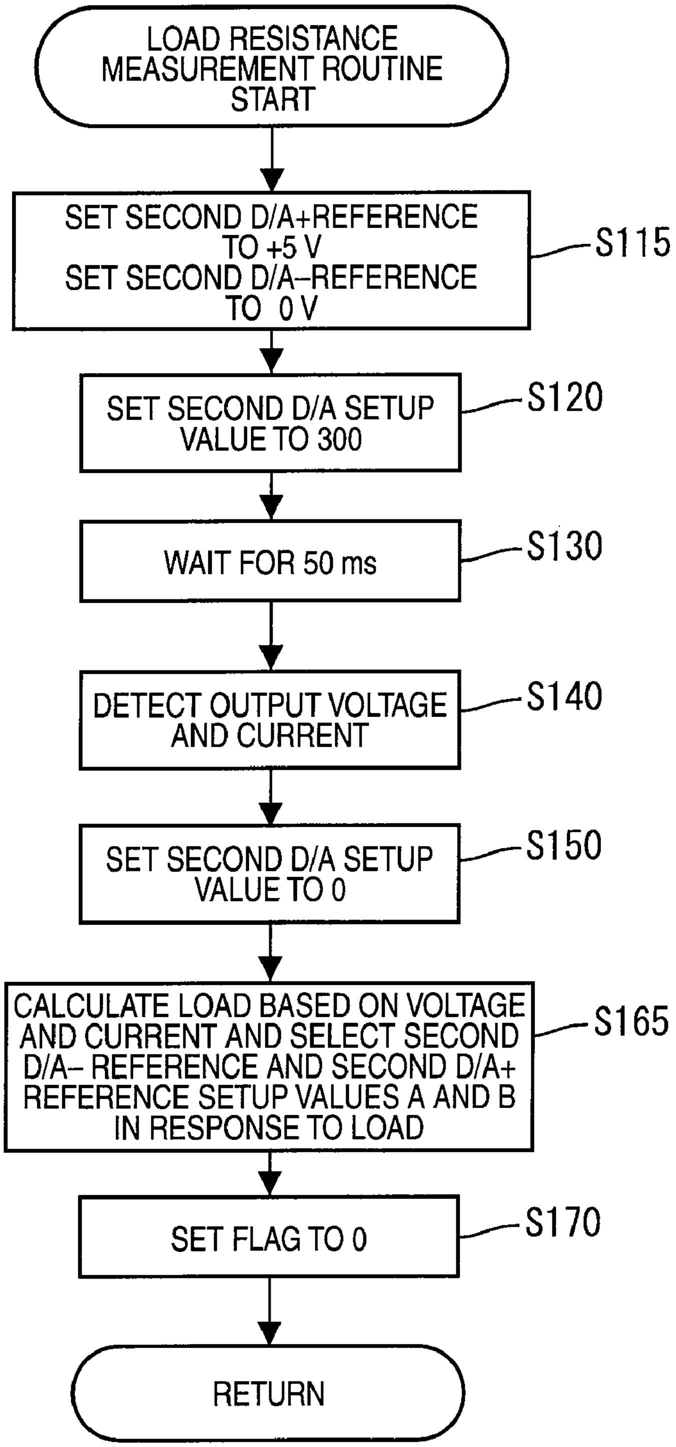
FIG. 8 is a flowchart illustrating processing of load resistance measurement according to the second embodiment.

As shown in FIG. 8, at step S115 of a "load resistance measurement" routine, a CPU 62 sets the value of "second D/A+ (plus) reference" to 5 V and sets the value of "second D/A− (minus) reference" to 0 V through the first D/A converter 63.

At step S165 in FIG. 8, the CPU 62 selects value "A" of "second D/A minus reference" and value "B" of "second D/A plus reference" in response to calculated load resistance R. More particularly, the CPU 62 selects the value of a switch control signal Sc so that the value of the first switch signal Vr1 of the first D/A converter 63 becomes "A" V, and selects the value of the switch control signal Sc so that the value of the second switch signal Vr2 of the first D/A converter 63 becomes "B" V. The value of "A" is smaller than the value of "B" as shown in FIG. 10 and the values of "A" and "B" are selected in the range of 0 V to 5 V in response to the load resistance R. The CPU 62 selects the values of "A" and "B" based on table data indicating the correspondence between the load resistance R and the values of "A" and "B," for example. The table data is stored in memory 72, for example.

Next, at step S170, the CPU 62 sets a flag to "0." The flag indicates whether the operation mode of the voltage applying unit 60A is a wide range mode in which the reference voltage range is a wide range (for example, range of 0 V to 5 V) and the voltage range of an analog control voltage Va is a wide range (for example, range of 0 V to 5 V) or a narrow range mode in which the reference voltage range is a narrower range than the wide range and the voltage range of the analog control voltage Va is a narrow range. In the wide range mode, the flag is set to "0;" in the narrow range mode, the flag is set to "1." In the graph of FIG. 10, the solid line portion corresponds to the narrow range mode and the whole of adding the thick dashed line portions to the solid line portion corresponds to the wide range mode.

Figure 9:
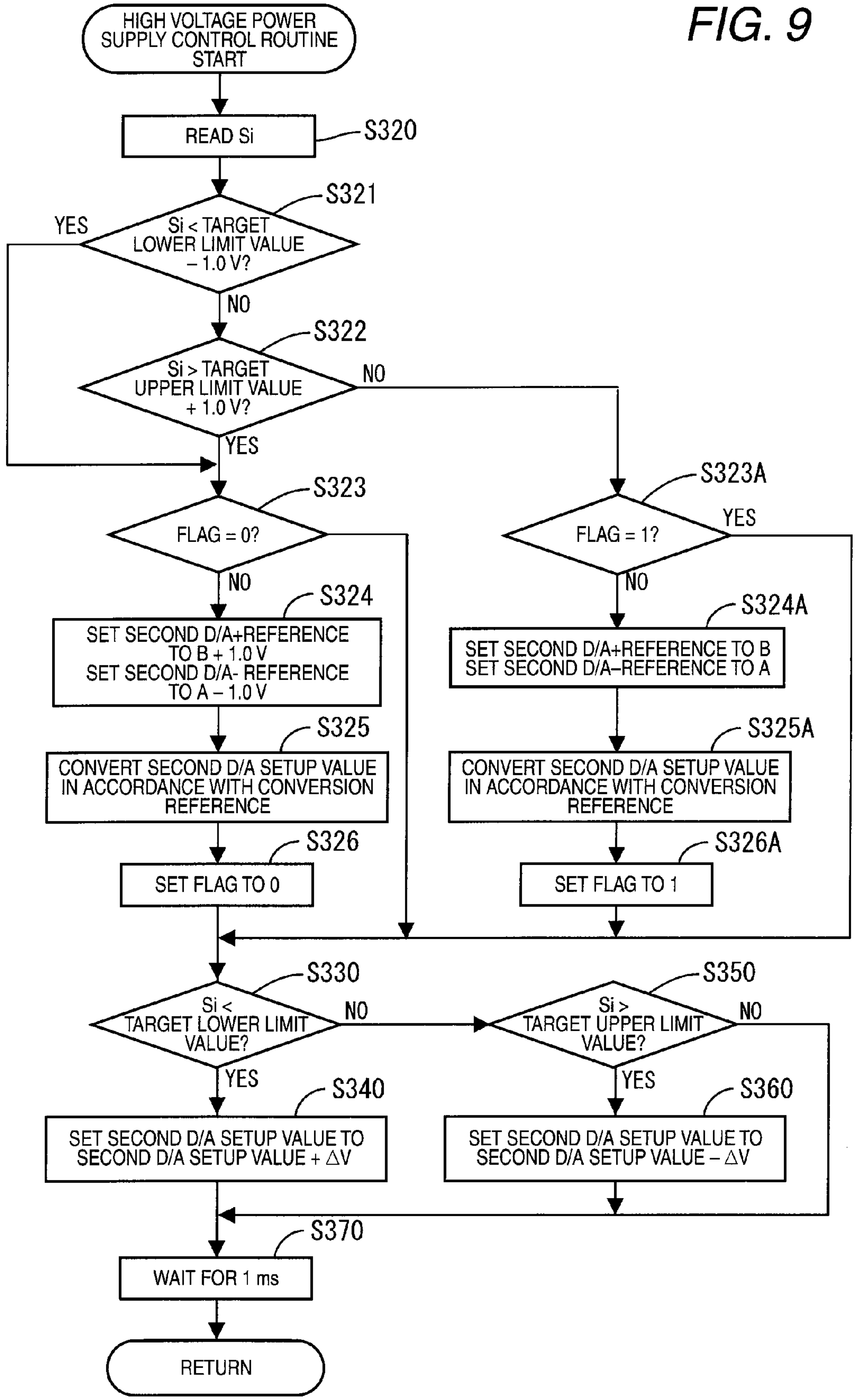
FIG. 9 is a flowchart illustrating processing of high voltage power supply control according to the second embodiment.
Figure 10:
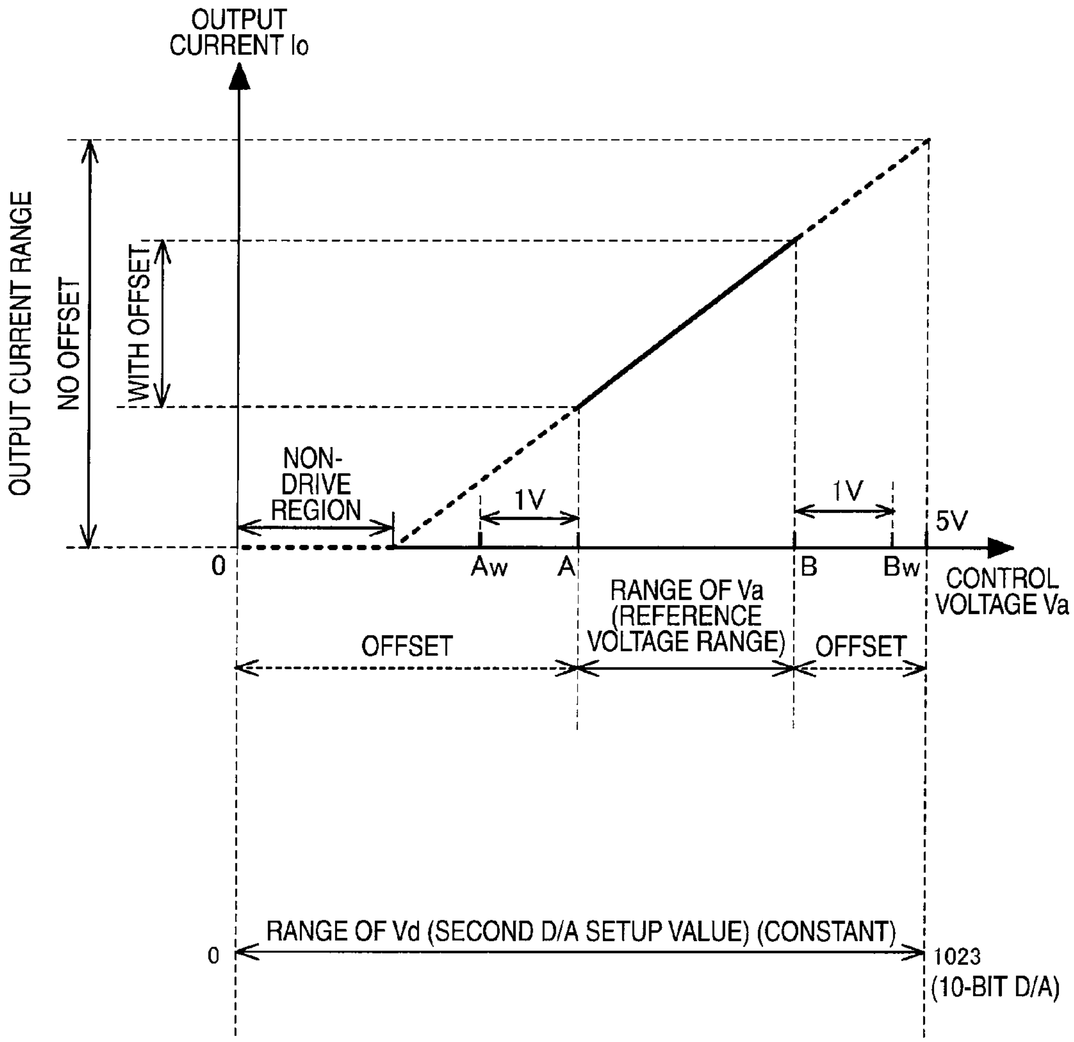
FIG. 10 is a graph schematically illustrating the output characteristic of the voltage applying unit according to the second embodiment.

As shown in FIG. 9, at step S321 of a "high voltage power supply control" routine, the CPU 62 determines whether or not a current detection value Si is smaller than a value resulting from subtracting a predetermined value (for example, 1.0 V) from the target lower limit value (corresponding to a second predetermined value in the invention) ("target lower limit value−1.0 V"). If the current detection value Si is smaller than "target lower limit value−1.0 V," the CPU 62 goes to step S323 and determines whether or not the flag is "0," namely, whether or not the present mode is the wide range mode. The determination at step S321 may be a determination as to whether or not the current detection value Si is equal to or less than the target lower limit value (second predetermined value), and the "predetermined value" is not limited to 1.0 V and is an arbitrary value.

On the other hand, if the CPU 62 determines at step S321 that the current detection value Si is equal to or greater than "target lower limit value−1.0 V," the CPU 62 goes to step S322 and determines whether or not the current detection value Si is larger than a value resulting from adding a predetermined value (for example, 1.0 V) to the target upper limit value (corresponding to a first predetermined value in the invention) ("target upper limit value+1.0 V"). If the current detection value Si is larger than "target upper limit value+1.0 V," the CPU 62 goes to step S323. The determination at step S322 may be a determination as to whether or not the current detection value Si is equal to or greater than the target upper limit value (first predetermined value), and the "predetermined value" is not limited to 1.0 V and is an arbitrary value.

On the other hand, if the current detection value Si is equal to or less than "target lower limit value+1.0 V," namely, if the current detection value Si is equal to or greater than "target lower limit value−1.0 V" and is equal to or less than "target lower limit value+1.0 V," the CPU 62 goes to step S323A and determines whether or not the flag is "1," namely, whether or not the present mode is the narrow range mode. If the flag is "1" and the present mode is the narrow range mode, the CPU 62 executes steps S330 to S370 shown in FIG. 5 and once exits the "high voltage power supply control" routine.

On the other hand, if the CPU 62 determines that the flag is not "1," namely, the present mode is the wide range mode, the CPU 62 goes to step 324A and sets the value of "A" selected at step S165 in FIG. 8 as the value of "second D/A minus reference" and sets the value of "B" as the value of "second D/A plus reference." That is, at step 324A, the reference voltage range is switched from the wide range to the narrow range and the operation mode is switched from the wide range mode to the narrow range mode.

Then, the second D/A converter 64 converts a digital control voltage (second D/A setup value) Vd into the analog control voltage Va in accordance with the conversion reference range set at step S324A (narrow range) (see step S325A). Next, at step S326A, the CPU 62 sets the flag to "1" and then executes steps S330 to S370 and once exits the "high voltage power supply control" routine.

Thus, in the second embodiment, when the current detection value Si becomes equal to or greater than "target lower limit value−1.0 V" or when the current detection value Si becomes equal to or less than "target upper limit value+1.0V," namely, if the output current Io becomes close to the target current, the reference voltage range is switched from the wide range to the narrow range. Thus, the conversion resolution of the second D/A converter 64 is enhanced and the control accuracy in the proximity of the target current of the output current Io is enhanced.

If the CPU 62 determines at S323 that the flag is "0," the CPU 62 also executes steps S330 to S370 and once exits the "high voltage power supply control" routine.

On the other hand, if the CPU 62 determines at step S323 that the flag is not "0," namely, the present range is the narrow range, the CPU 62 goes to step 324 and sets a value resulting from subtracting a predetermined value (for example, 1.0 V) from the value of "A" selected at step S165 in FIG. 8 ("Aw" value in FIG. 10) as the value of "second D/A minus reference" and sets a value resulting from adding a predetermined value (for example, 1.0 V) to the value of "B" ("Bw" value in FIG. 10) as the value of "second D/A plus reference."

That is, in the second embodiment, if the output current Io is generated beyond predetermined current range in the narrow range mode in which the reference voltage range is switched to the narrow range, the reference voltage range is widened a predetermined amount from "A-B" to "Aw-Bw."

Then, the second D/A converter 64 converts the digital control voltage (second D/A setup value) Vd into the analog control voltage Va in accordance with the conversion reference range widened the predetermined amount at step S324 (see step S325). Next, at step S326, the CPU 62 sets the flag to "0" because the reference voltage range is widened the predetermined amount from the narrow range and then the CPU 62 executes steps S330 to S370 and once exits the "high voltage power supply control" routine.

6. Advantages of Second Embodiment

If the output current Io becomes close to the target current, the reference voltage range is switched from the wide range to the narrow range. Thus, the conversion resolution of the second D/A converter 64 is enhanced and the control accuracy in the proximity of the target current of the output current Io is enhanced.

If the output current Io is generated exceeding any desired current range in the narrow range mode in which the reference voltage range of the second D/A converter 64 is switched to the narrow range, the reference voltage range is widened the predetermined amount, whereby control of the output current Io can be continued suitably.

Further, the reference voltage range of the second D/A converter 64 can be switched easily and suitably by using the already existing component (first D/A converter 63).

Third Embodiment

Next, a third embodiment of the invention will be discussed with reference to FIGS. 11 and 12. Here, FIG. 12 shows a graph in predetermined load resistance R like FIG. 10.

The first to third embodiments are identical in general flow of the control processing of the output current Io shown in FIG. 3. The second and third embodiments equal in the configuration of voltage applying unit 60 and processing of "load resistance measurement" routine and differ only in processing of "high voltage power supply control" routine. Thus, only the difference in the processing of the "high voltage power supply control" routine will be discussed below. In FIGS. 11 and 12, steps identical with those of the second embodiment are denoted by the same step numbers and will not be discussed again.

Figure 11:
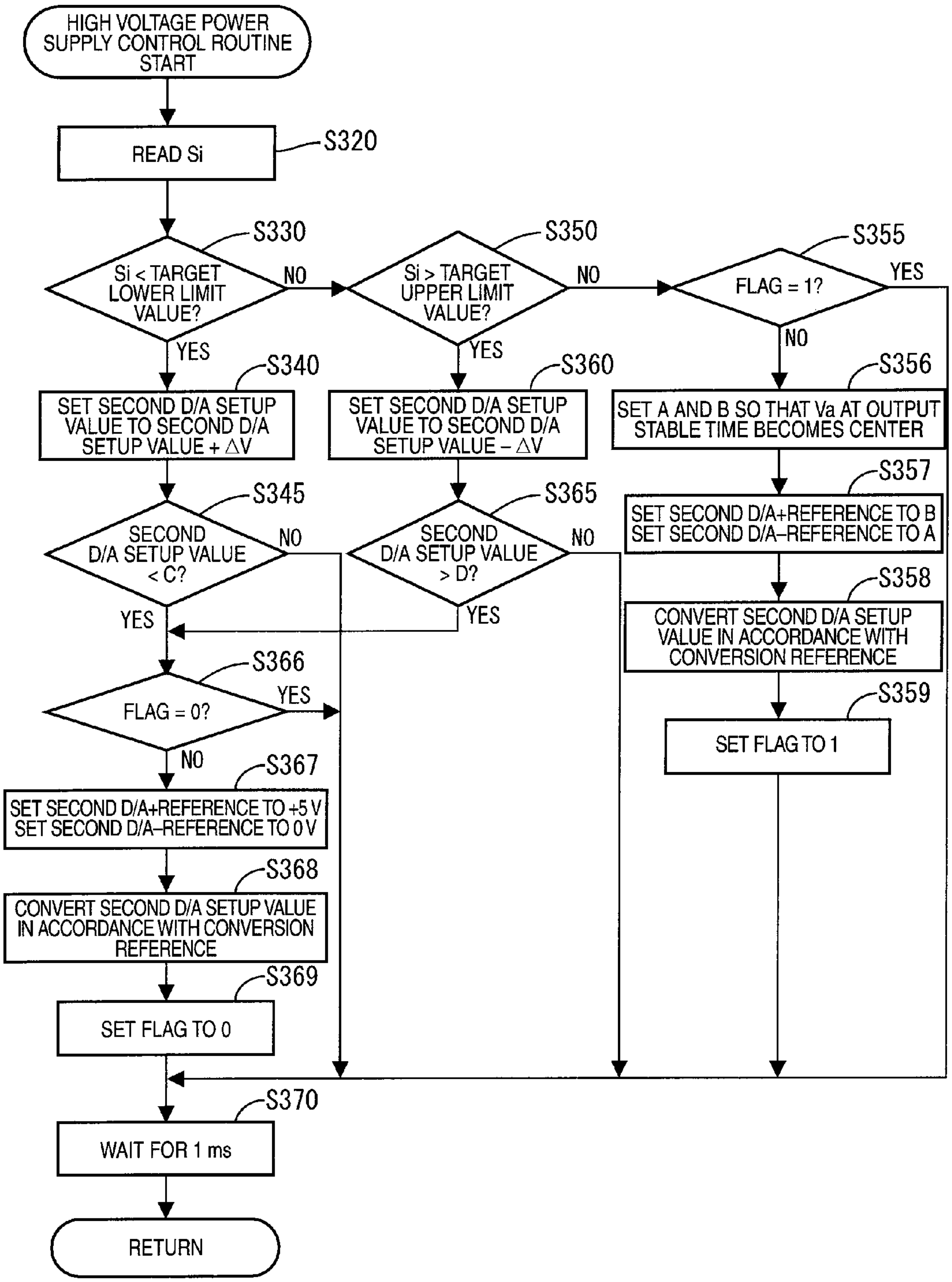
FIG. 11 is a flowchart illustrating processing of high voltage power supply control according to a third embodiment of the present invention.
Figure 12:
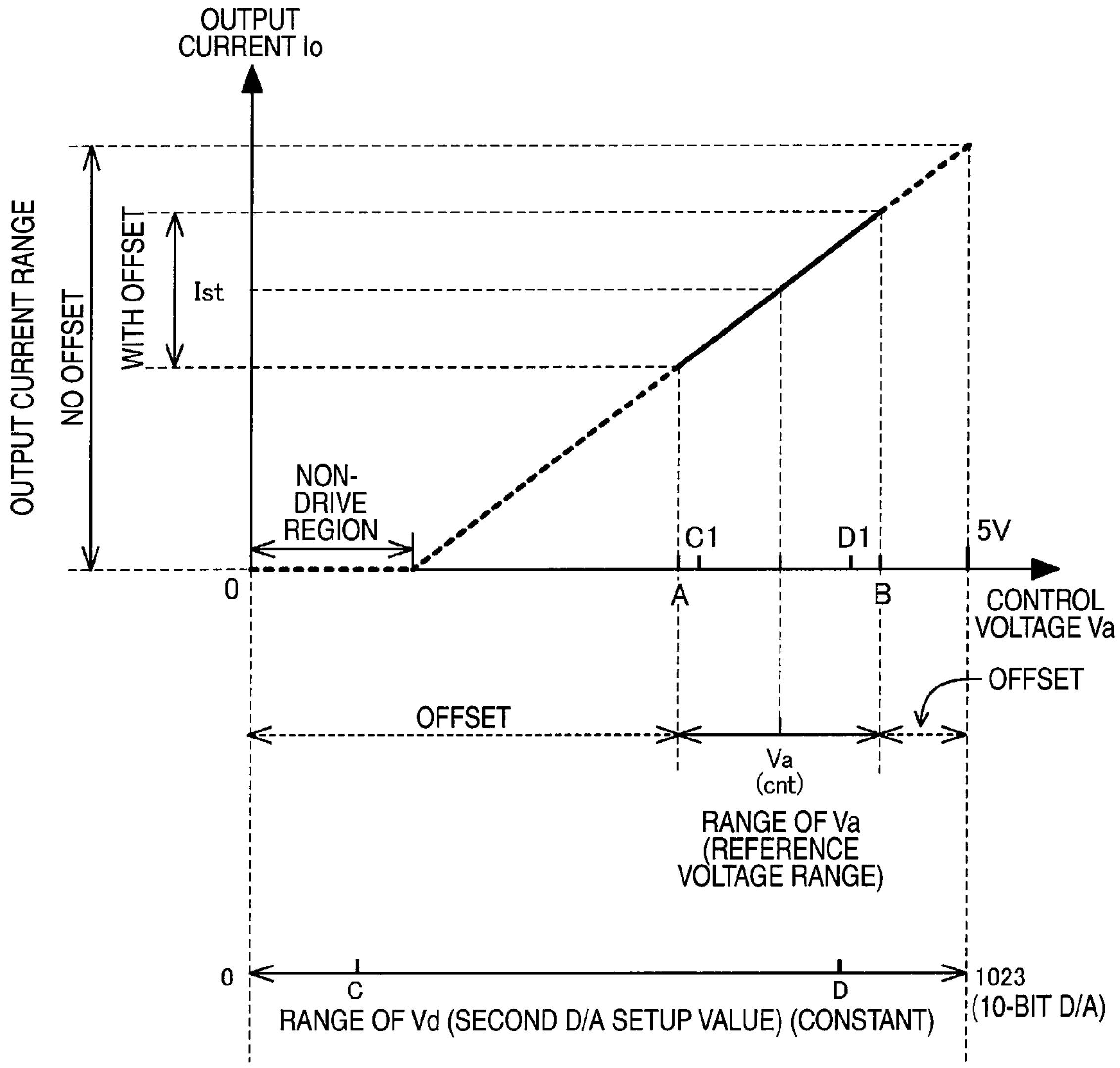
FIG. 12 is a graph schematically illustrating the output characteristic of a voltage applying unit in the third embodiment of the invention.

As shown in FIG. 11, if a CPU 62 does not determine at S350 that a current detection value Si is larger than a target upper limit value, namely, if the current detection value Si is equal to or greater than a target lower limit value and is equal to or less than the target upper limit value, the CPU 62 goes to step S355 and determines whether or not a flag is "1," namely, whether or not the present mode is a narrow range mode. If the flag is "1" and the present mode is the narrow range mode, the CPU 62 goes to step S370 and waits for a predetermined time (for example, 1 ms) and once exits the "high voltage power supply control" routine. The CPU 62 returns to the main routine (step S400) in FIG. 3.

On the other hand, if the CPU 62 determines that the flag is not "1," namely, the present mode is a wide range mode, the CPU 62 goes to step 356 and sets the narrow range so that an analog control signal value Va (digital control signal value Vd) when output current Io reaches the stable time in the wide range when the range is switched to the narrow range becomes almost the center value of the analog control signal value Va in the narrow range. In other words, the CPU 62 sets values of "A" and "B" so that the analog control voltage Va corresponding to a stable output current Ist of the output current Io at the output stable time in the wide range mode becomes almost the center value of the voltage range in the narrow range mode. That is, in FIG. 12, the analog control voltage center value Va (cnt) is almost the center value of the voltage range ("A-B") of the analog control voltage Va and the output current Io corresponding to the analog control voltage center value Va (cnt) becomes the stable output current Ist.

Next, at step S357, the CPU 62 sets the value of "A" set at step S356 as the value of "second D/A minus reference" and sets the value of "B" as the value of "second D/A plus reference." That is, at step 357, the reference voltage range is switched from the wide range to the narrow range and the operation mode is switched from the wide range mode to the narrow range mode.

Then, a second D/A converter 64 converts a digital control voltage (second D/A setup value) Vd into the analog control voltage Va in accordance with the conversion reference range set at step S357 (reference voltage range) (see step S328). Next, at step S359, the CPU 62 sets the flag to "1" and goes to step S370. The CPU 62 waits for a predetermined time (for example, 1 ms) and once exits the "high voltage power supply control" routine and returns to the main routine (step S400) in FIG. 3.

If the read current detection value Si is smaller than the target lower limit value and the second D/A setup value (digital control voltage Vd) is set to "second D/A setup value+ΔV" (see steps S330 and S340), at step S345, the CPU 62 determines whether or not the changed second D/A setup value is smaller than a predetermined value "C." If the second D/A setup value is smaller than the predetermined value "C," the CPU 62 goes to step S366 and determines whether or not the flag is "0," namely, whether or not the present mode is the wide range mode. On the other hand, if the second D/A setup value is equal to or greater than the predetermined value "C," the CPU 62 goes to step S370. The CPU 62 waits for a predetermined time (for example, 1 ms) and once exits the "high voltage power supply control" routine and returns to the main routine (step S400) in FIG. 3. The value of the analog control voltage Va corresponding to the second D/A setup value "C" corresponds to value "C1" shown in FIG. 12.

If the CPU 62 determines at step S366 that the flag is "0" and the present mode is the wide range mode, the CPU 62 goes to step S370. The CPU 62 waits for a predetermined time (for example, 1 ms) and once exits the "high voltage power supply control" routine and returns to the main routine (step S400) in FIG. 3.

On the other hand, if the CPU 62 determines at step S366 that the flag is not "0" and the present mode is the narrow range mode, the CPU 62 goes to step S367, sets "+5 V" as the value of "second D/A plus reference," sets "0 V" as the value of "second D/A minus reference," and restores the operation mode from the narrow range mode to the wide range mode. That is, if the output current Io decreases and the current detection value Si largely falls below the target lower limit value and the analog control voltage Va largely falls below the value of "C1," the operation mode is restored from the narrow range mode to the wide range mode.

Then, the second D/A converter 64 converts the digital control voltage (second D/A setup value) Vd into the analog control voltage Va in accordance with the conversion reference range of the wide range mode set at step S367 (see step S368). Next, at step S369, the CPU 62 sets the flag to "0" because the operation mode is restored to the wide range mode, and the CPU 62 goes to step S370. The CPU 62 waits for a predetermined time (for example, 1 ms) and once exits the "high voltage power supply control" routine and returns to the main routine (step S400) in FIG. 3.

If the read current detection value Si is larger than the target upper limit value and the second D/A setup value is set to "second D/A setup value−ΔV" (see steps S350 and S360), at step S365, the CPU 62 determines whether or not the second D/A setup value is larger than a predetermined value "D." If the second D/A setup value is larger than the predetermined value "D," the CPU 62 executes steps S366 to S369. The value of the analog control voltage Va corresponding to the second D/A setup value "D" corresponds to value "D1" shown in FIG. 12. Thus, if the output current Io rises and the current detection value Si largely exceeds the target upper limit value and the value of the analog control voltage Va exceeds the value of "D1," the operation mode is restored from the narrow range mode to the wide range mode.

On the other hand, if the second D/A setup value is equal to or less than the predetermined value "D," CPU 62 goes to step S370. The CPU 62 waits for a predetermined time (for example, 1 ms) and once exits the "high voltage power supply control" routine and returns to the main routine (step S400) in FIG. 3.

7. Advantages of Third Embodiment

In the third embodiment, when the current detection value Si rises exceeding the target lower limit value, namely, when the output current Io becomes close to the target current, the reference voltage range is switched from the wide range to the narrow range. At the time, the analog control voltage Va (digital control signal value Vd) corresponding to the stable output current ist in the wide range mode is the center value of the voltage range of the analog control voltage Va in the narrow range mode. Thus, setting of the narrow range ("A-B") is more optimized relative to the target output current and the output current Io can be controlled with high accuracy and suitably in the narrow range mode.

If the output current Io is generated beyond any desired current range in the narrow range mode in which the reference voltage range is switched to the narrow range, the reference voltage range is again widened to the wide range, whereby control of the output current Io can be continued suitably.

Other Embodiments

It is to be understood that the invention is not limited to the embodiments described with reference to the accompanying drawings and the following embodiments, for example, are also contained in the technical scope of the invention:

(1) In the embodiments described above, the example concerning the output control of the voltage applying unit (power supply unit) (60, 60A) in performing constant current control of the output current Io flowing into the load is shown. However, the output control of the power supply unit according to the invention can also be applied when constant voltage control of the output voltage Vo applied to the load is performed. At the time, the CPU 62 may supply to the second D/A converter 64 the digital control signal Vd appropriately changed based on the voltage detection signal Sv (feedback signal) responsive to the output voltage Vo so that the output voltage Vo falls within the proximity of a predetermined target voltage, and may execute the constant voltage control.

(2) In the embodiments described above, the configuration when the voltage applying unit (power supply unit) (60, 60A) generates single output voltage Vo is shown. However, the power supply unit of the invention can also be applied when a plurality of output voltages Vo different in voltage value are generated and are applied to a plurality of loads. In this case, a D/A converter of multiple channels is used and the offset voltage or the reference voltage range is changed for each used channel.

(3) In the second embodiment, if the current detection value Si is smaller than "target lower limit value−1.0 V" or if the current detection value Si is larger than "target lower limit value+1.0 V," both "second D/A minus reference" and "second D/A plus reference" are changed by way of example, but the invention is not limited to it. For example, if the current detection value Si is smaller than "target lower limit value−1.0 V," only "second D/A minus reference" may be decreased. If the current detection value Si is larger than "target lower limit value+1.0 V," only "second D/A plus reference" may be increased.

(4) In the second and third embodiments, when constant current control is performed for load and the values of "A" and "B" are selected in response to the load resistance R, from the output characteristic graph (see FIG. 6), preferably the larger the load resistance R, the larger set the value of "B," namely, the value of "second D/A plus reference" and the smaller the load resistance R, the larger set the value of "A," namely, the value of "second D/A minus reference." In other words, to enhance the control accuracy, preferably the smaller the load resistance R, the narrower the voltage range ("A-B") of the analog control voltage Va.

(5) When the operation mode is changed from the wide range mode to the narrow range mode, to change the reference voltage range of the second D/A converter 64, the reference voltage range may be determined according to the load resistance value R and the range of use of the output voltage Vo or according to the load resistance value R and the range of use of the output current Io. In this case, if the load resistance value R is known, the inclination of the graph in FIG. 6 is also known and in addition, if the range of use of a predetermined desired output voltage Vo or the range of use of the load current Io is considered, the reference voltage range can be determined.

The present invention can be implemented in illustrative non-limiting aspects as follows:

In a first aspect, there is provided a power supply unit comprising: an output generation circuit that generates an output corresponding to an supplied drive signal and supplies the output to a load; a detection circuit that receives the output and generates a detection signal in response to the output; a control circuit that generates a digital control signal for controlling a value of the output toward a target value in response to the detection signal; a first D/A conversion circuit that receives the digital control signal and converts the digital control signal into an analog control signal, the first D/A conversion circuit being capable of setting a reference range for defining a voltage range of the analog control signal; a driving circuit that generates the drive signal in response to the analog control signal and supplies the drive signal to the output generation circuit; and a range switching circuit that switches the reference voltage range of the first D/A conversion circuit between a wide range and a narrow range narrower than the wide range.

According to the above configuration, it is possible to enhance the control accuracy of the output of the power supply unit by simply changing the reference voltage range of the first D/A conversion circuit to appropriately change the voltage range of the analog control signal, without using any complicated circuit configuration.

In a second aspect, there is provided the power supply unit according to the first aspect, wherein the range switching circuit switches the reference voltage range in response to the value of the output.

According to the above configuration, it is possible to control the output voltage with high accuracy toward the target value by switching the reference voltage range in such a manner that when the value of the output voltage is low, namely, when the output voltage is started, the reference voltage range is set to the wide range and when the value of the output voltage is high, namely, when the output voltage is stable, the reference voltage range is set to the narrow range, for example.

In a third aspect, there is provided the power supply unit according to the first aspect or the second aspect, wherein the output includes an output voltage and an output current flowing when the output voltage is applied to the load, wherein the detection circuit includes: a voltage detection circuit that receives the output voltage and generates a voltage detection signal in response to the received output voltage; and a current detection circuit that receives the output current and generates a current detection signal in response to the received output current, wherein the control circuit calculates a load resistance value of the load based on the voltage detection signal and the current detection signal, and wherein the range switching circuit switches the reference voltage range in response to the load resistance value.

Usually, to supply the output voltage or the output current to the load toward the target voltage or the target current by the power supply unit, the required applied voltage range or current range (output range) varies in response to the load resistance value. Thus, according to the above configuration, the reference voltage range is switched in response to the load resistance value, whereby the output (the output voltage or the output current) can be suitably controlled toward the target voltage or the target current in response to the load.

In fourth aspect, there is provided the power supply unit according to the third aspect, wherein the control circuit determines the reference voltage range according to the load resistance value and a range of use of the output voltage or a range of use of the output current.

According to the above configuration, the reference voltage range of the first D/A conversion circuit is changed in response to the range of use of the output voltage or the range of use of the output current, whereby the voltage range of the analog control signal adapted to the range of use of the output voltage or the range of use of the output current can be obtained. Therefore, it is possible to enhance the control accuracy of the output (the output voltage or the output current) of the power supply unit.

In fifth aspect, there is provided the power supply unit according to any one of the first aspect to the fourth aspect, wherein the range switching circuit increases at least an upper limit value of the reference voltage range when the detection signal becomes equal to or greater than a first predetermined value corresponding to the upper limit value in a case where the upper limit value is set smaller than the maximum value of the reference voltage range, and wherein the range switching circuit decreases at least a lower limit value of the reference voltage range when the detection signal becomes equal to or less than a second predetermined value corresponding to the lower limit value in a case where the lower limit value is set larger than the minimum value of the reference voltage range.

According to the above configuration, when the reference voltage range is switched to the narrow range and the range of the controlled output (the output voltage or the output current) is narrowed to any desired range (narrow range mode), if the output is generated exceeding the desired range, the reference voltage range is again widened, whereby control of the output of the power supply unit can be continued suitably.

In a sixth aspect, there is provided the power supply unit according to any one of the first aspect to the fifth aspect, wherein the range switching circuit set the reference voltage range to the wide range at the time of starting generation of the output and set the reference voltage range to the narrow range when the output reaches a stable period, and wherein the narrow range is set so that the value of the analog control signal when the output reaches the stable period becomes almost a center value of the narrow range at the time of switching the reference voltage range to the narrow range.

According to the above configuration, it is necessary to emphasize the stability of the output after the output (the output voltage or the output current) reaches the stable period. In the narrow range of the reference voltage range (narrow range mode), the value of the analog control signal when the output is stable in the wide range is set to almost the center value of the narrow range. Thus, setting of the narrow range is more optimized relative to the target output and in the narrow range mode, the output of the power supply unit can be controlled with high accuracy and suitably.

In a seventh aspect, there is provided the power supply unit according to any one of the first aspect to the sixth aspect, wherein the first D/A conversion circuit includes a first reference terminal for setting an upper limit value of the reference voltage range and a second reference terminal for setting a lower limit value of the reference voltage range, and wherein the range switching circuit generates a switch signal for switching the reference voltage range and supplies the switch signal to at least one of the first reference terminal and the second reference terminal, thereby switching the reference voltage range.

According to the above configuration, the voltage range of the analog control signal, namely, the control range of the output voltage can be changed easily and suitably by using the already existing component (D/A converter).

In an eighth aspect, there is provided the power supply unit according to the seventh aspect, wherein the range switching circuit includes a second D/A conversion circuit, and wherein the control circuit generates a switch control signal for generating the switch signal in response to the detection signal and supplies the switch control signal to the second D/A conversion circuit.

According to the above configuration, the reference voltage range can be switched easily and suitably by using the already existing component (D/A converter).

In ninth aspect, there is provided an image forming apparatus comprising: the power supply unit according to the first aspect to the eighth aspect; and an image forming unit that forms an image on a recording medium using the output supplied from the output generation circuit of the power supply unit.

According to the above configuration, the output (output voltage or output current) used to form an image is generated with high accuracy with the simple configuration. Consequently, the quality of the formed image is enhanced.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A power supply unit comprising:

an output generation circuit that generates an output corresponding to an supplied drive signal and supplies the output to a load;

a detection circuit that receives the output and generates a detection signal in response to the output;

a control circuit that generates a digital control signal for controlling a value of the output toward a target value in response to the detection signal;

a first D/A conversion circuit that receives the digital control signal and converts the digital control signal into an analog control signal, the first D/A conversion circuit being capable of setting a reference range for defining a voltage range of the analog control signal;

a driving circuit that generates the drive signal in response to the analog control signal and supplies the drive signal to the output generation circuit; and a range switching circuit that switches the reference voltage range of the first D/A conversion circuit between a wide range and a narrow range narrower than the wide range.

2. The power supply unit according to claim 1, wherein the range switching circuit switches the reference voltage range in response to the value of the output.

3. The power supply unit according to claim 1, wherein the output includes an output voltage and an output current flowing when the output voltage is applied to the load, wherein the detection circuit includes:

a voltage detection circuit that receives the output voltage and generates a voltage detection signal in response to the received output voltage; and a current detection circuit that receives the output current and generates a current detection signal in response to the received output current, wherein the control circuit calculates a load resistance value of the load based on the voltage detection signal and the current detection signal, and wherein the range switching circuit switches the reference voltage range in response to the load resistance value.

4. The power supply unit according to claim 3, wherein the control circuit determines the reference voltage range according to the load resistance value and a range of use of the output voltage or a range of use of the output current.

5. The power supply unit according to claim 1, wherein the range switching circuit increases at least an upper limit value of the reference voltage range when the detection signal becomes equal to or greater than a first predetermined value corresponding to the upper limit value in a case where the upper limit value is set smaller than the maximum value of the reference voltage range, and wherein the range switching circuit decreases at least a lower limit value of the reference voltage range when the detection signal becomes equal to or less than a second predetermined value corresponding to the lower limit value in a case where the lower limit value is set larger than the minimum value of the reference voltage range.

6. The power supply unit according to claim 1, wherein the range switching circuit set the reference voltage range to the wide range at the time of starting generation of the output and set the reference voltage range to the narrow range when the output reaches a stable period, and wherein the narrow range is set so that the value of the analog control signal when the output reaches the stable period becomes almost a center value of the narrow range at the time of switching the reference voltage range to the narrow range.

7. The power supply unit according to claim 1, wherein the first D/A conversion circuit includes a first reference terminal for setting an upper limit value of the reference voltage range and a second reference terminal for setting a lower limit value of the reference voltage range, and wherein the range switching circuit generates a switch signal for switching the reference voltage range and supplies the switch signal to at least one of the first reference terminal and the second reference terminal, thereby switching the reference voltage range.

8. The power supply unit according to claim 7, wherein the range switching circuit includes a second D/A conversion circuit, and wherein the control circuit generates a switch control signal for generating the switch signal in response to the detection signal and supplies the switch control signal to the second D/A conversion circuit.

9. An image forming apparatus comprising:

the power supply unit according to claim 1; and an image forming unit that forms an image on a recording medium using the output supplied from the output generation circuit of the power supply unit.

* * * * *